US006421827B1

(12) United States Patent
Dimpsey et al.

(10) Patent No.: US 6,421,827 B1
(45) Date of Patent: Jul. 16, 2002

(54) SYSTEM AND METHOD FOR DETECTING AND REORDERING LOADING PATTERNS

(75) Inventors: Robert Tod Dimpsey, Austin, TX (US); Michael Richard Fortin, Redmond, WA (US); Maher Saba, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/992,467

(22) Filed: Dec. 17, 1997

(51) Int. Cl.$^7$ .............................................. G06F 9/445
(52) U.S. Cl. ....................................... 717/178; 709/331
(58) Field of Search .......................... 711/137; 395/651, 395/652; 707/522; 709/305, 332, 331; 717/178

(56) References Cited

U.S. PATENT DOCUMENTS

| | | | | |
|---|---|---|---|---|
| 4,257,097 A | * | 3/1981 | Moran ......................... | 711/119 |
| 5,202,975 A | * | 4/1993 | Rasbold et al. ............. | 717/151 |
| 5,247,678 A | | 9/1993 | Littleton | |
| 5,291,601 A | | 3/1994 | Sands | |
| 5,339,438 A | | 8/1994 | Conner et al. | |
| 5,369,766 A | | 11/1994 | Nakano et al. | |
| 5,418,971 A | | 5/1995 | Carlson | |
| 5,428,780 A | * | 6/1995 | England et al. ............. | 717/142 |
| 5,475,840 A | | 12/1995 | Nelson et al. | |
| 5,539,908 A | | 7/1996 | Chen et al. | |
| 5,555,411 A | * | 9/1996 | England et al. ............. | 717/162 |
| 5,581,768 A | | 12/1996 | Garney et al. | |
| 5,664,191 A | * | 9/1997 | Davidson et al. ........... | 709/100 |
| 5,752,038 A | * | 5/1998 | Blake et al. ................. | 717/158 |
| 5,829,017 A | * | 10/1998 | Ohtsuka ...................... | 711/113 |
| 5,878,263 A | * | 3/1999 | Fortin et al. ................ | 717/162 |
| 5,903,917 A | * | 5/1999 | Douceur et al. ............ | 711/201 |
| 5,918,246 A | * | 6/1999 | Goodnow et al. .......... | 711/137 |

OTHER PUBLICATIONS

Kempf et al., "Cross–Address Space Dynamic Linking," Sun Microsystems Laboratories, Inc., pp. 0–11, Sep. 1992.*

"Improving Data Migration Performance for a Network Environment", *IBM TDB*, vol. 37, No. 12, pp. 23–25, Dec. 1994.

C. S. Feedman et al, "SPIFFI–A Scalable Parallel File System for the Intel Paragon", *IEEE Transaction on Parallel and Distributed Systems*, vol. 7, No. 11, pp. 1185–1200, Nov. 1996.

* cited by examiner

*Primary Examiner*—Zarni Maung
*Assistant Examiner*—Gary Scott Fourson
(74) *Attorney, Agent, or Firm*—Leslie A. Van Leeuwen

(57) ABSTRACT

The present invention is a method, system, and computer readable medium for detecting the loading pattern of application and library files, and then reordering the files so that future loads are performed more efficiently. The present invention detects the loading pattern of an application file and library files, and then reorders the pages within the application and library executable files so that future loads are sequential. After being reordered, the application and library files are relinked in order to resolve references. A sequential load access pattern is beneficial, as it takes full advantage of read-ahead performed by the file system. The present invention allows pages of an application or library executable file to be stored in the order in which they will most likely be loaded. Thus, when the file system performs read-ahead, and brings additional pages into memory, these additional pages are the next pages needed and are loaded. By taking advantage of the file system's read-ahead process, application and library load times can be reduced, because I/O wait time associated with the request of pages is overlapped with the processing (i.e. loading) of previously requested pages.

12 Claims, 4 Drawing Sheets

SYSTEM AND METHOD FOR DETECTING AND REORDERING LOADING PATTERNS

FIELD OF THE INVENTION

The present invention relates to information handling systems, and, more particularly, to a system and method for detecting and reordering the loading patterns of application and library files.

BACKGROUND OF THE INVENTION

After code is written, either for an application program or for a library file (e.g., a dynamically linked library, or DLL), it is compiled into object code. An application program typically consists of one or more separately compiled program modules. A computer program, known as a linker, accepts the separately compiled object code files, and links them together into an executable application program file. As part of the linking step, the linker resolves references between the program modules.

A DLL is a library file which is dynamically loaded when an application program is either loaded or executed, rather than being compiled and linked into the application program's executable file. This means that the same block of library code can be shared between several application programs, rather than each application program containing copies of the library code it uses. A DLL typically consists of one or more separately compiled library modules. A linker links the object code files of the separately compiled library modules into one DLL file.

Linkers produce executable application and library files with clearly defined object boundaries. In other words, the pages from a particular data object are grouped next to one another, and are not intermixed with pages from another data object or from other types of objects, such as text objects or resource objects. Furthermore, the pages within a given object typically have sequential file offsets. In other words, the first page of the object is page zero, the second page of the object is page one, etc. While this file-offset grouping is convenient for the linker to produce, it may negatively impact application and library load times. As discussed below, the pages within an object are rarely loaded in sequential order.

To execute an application program, an application program executable file and any required library files are loaded by a loader. A loader begins by loading the first page of the application program. The loader next loads any pages within the application program referenced by the first page. The pages within the application program which are referenced by the first page are not necessarily the next sequential pages in the application program executable file. Similarly, as each additional page is loaded, any pages referenced by the loaded page are also loaded. Thus, the pages of the application program are typically loaded in a non-sequential manner. Page reference patterns are rarely sequential within an object, and generally involve random referencing between many objects.

A DLL is loaded on an "as-needed" basis by the loader, either as the application program is being loaded or while it is executing. The loader begins by loading the first page of the DLL. The loader next loads any DLL pages referenced by the first page of the DLL. The pages referenced by the first DLL page are not necessarily the next sequential pages of the DLL file, and may even be pages of other DLL files. As each additional page is loaded, any pages referenced by the loaded page are also loaded. Thus, as with the application program, the pages of DLL files are also typically loaded in a non-sequential manner. Within a DLL, as within an application program, page reference patterns are rarely sequential within an object, and generally involve random referencing between many objects.

Loading pages in a non-sequential manner is inefficient. Most file systems perform a function referred to as "read-ahead." When a page is requested from disk (or other storage) in order to be loaded into memory, the file system obtains the requested page, along with one or more pages stored immediately following the requested page. Because the loader rarely loads pages in sequential order, however, these additional pages are usually not the next pages needed. Non-sequential loading does not allow the loader to take advantage of the file system's read-ahead capabilities.

Consequently, it would be desirable to have a system and method for loading application and library files in an efficient manner. It would also be desirable to take advantage of read-ahead capabilities of a file system in order to reduce application and library load times.

SUMMARY OF THE INVENTION

Accordingly, the present invention is directed to a method, system, and computer readable medium for detecting the loading pattern of application and library files, and then reordering the files so that future loads are performed more efficiently. The present invention detects the loading pattern of an application file and library files, and then reorders the pages within the application and library executable files so that future loads are sequential. After being reordered, the application and library files are relinked in order to resolve references.

One advantage of the present invention is that the reordering is done such that the pages referenced when an application file or library file is loaded are sequentially placed within the executable file. A sequential load access pattern is beneficial, as it takes full advantage of read-ahead performed by the file system. When a page is referenced and brought into memory, most file systems automatically bring one or more additional pages into memory. If the additional pages are not needed, they are not used by the loader. However, the present invention allows pages of an executable file to be stored in the order in which they will most likely be loaded. Thus, when the file system performs read-ahead, and brings additional pages into memory, these additional pages are the next pages needed and are loaded. By taking advantage of the file system's read-ahead process, application and library load times can be reduced, because I/O wait time associated with the request of pages is overlapped with the processing (i.e. loading) of previously requested pages.

Another advantage of the present invention is that library pages which are not used are less likely to even be accessed from storage. By storing the pages of a library file in the order in which the library file is loaded, pages that are referenced are stored before those pages which are not referenced. Thus, pages which are not referenced are not likely to ever be brought into memory by the file system's read-ahead process.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which.

DETAILED DESCRIPTION OF A PREFERRED EMBODIMENT OF THE INVENTION

Figure 1:
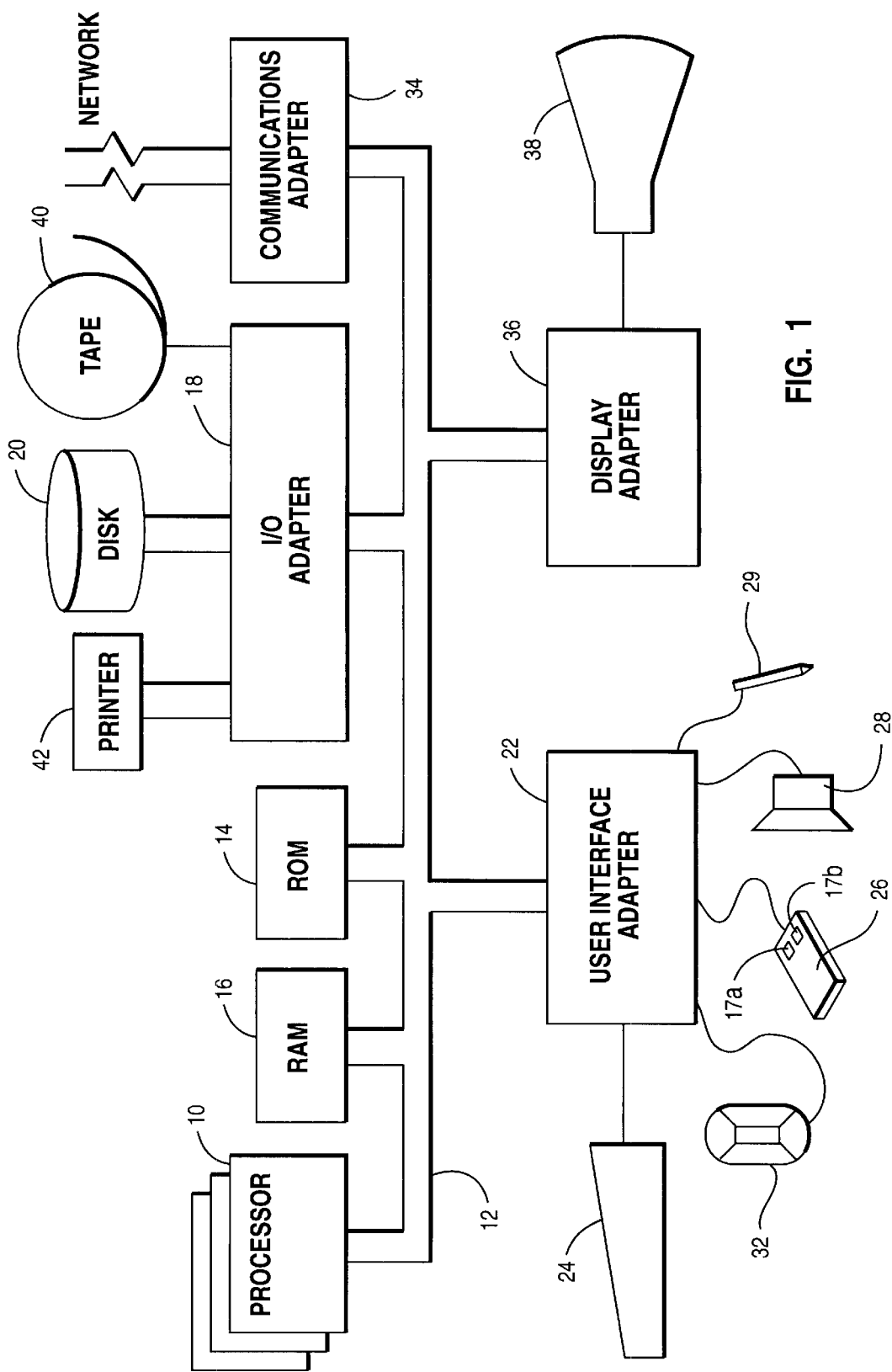
FIG. 1 is a block diagram of an information handling system capable of executing the reordering method of the present invention.

The invention may be implemented on a variety of hardware platforms, including personal computers, workstations, mini-computers, and mainframe computers. Many of the steps of the method of the present invention may be advantageously implemented on parallel processors of various types. Referring now to FIG. 1, a typical configuration of an information handling system that may be used to practice the novel method of the present invention will be described. The computer system of FIG. 1 has at least one processor 10. Processor 10 is interconnected via system bus 12 to random access memory (RAM) 16, read only memory (ROM) 14, and input/output (I/O) adapter 18 for connecting peripheral devices such as disk units 20, tape drives 40, and printers 42 to bus 12, user interface adapter 22 for connecting keyboard 24, mouse 26 having buttons 17a and 17b, speaker 28, microphone 32, and/or other user interface devices such as a touch screen device 29 to bus 12, communication adapter 34 for connecting the information handling system to a data processing network, and display adapter 36 for connecting bus 12 to display device 38.

Communication adaptor 34 may link the system depicted in FIG. 1 with hundreds or even thousands of similar systems, or other devices, such as remote printers, remote servers, or remote storage units. The system depicted in FIG. 1 may be linked to both local area networks (sometimes referred to as Intranets) and wide area networks, such as the Internet.

Application programs executed in the information handling system depicted in FIG. 1, and the libraries used by these application programs, are often stored on tape 40 or disk 20. Application programs or libraries may also be stored on another system, and downloaded via a network. In order to be executed, a program, and its needed libraries, are loaded from tape 40, disk 20, or a network into RAM 16.

An analysis of application and library loading characteristics reveals two important points. First, repeated loads of an application or library produce consistent page reference patterns on each load. Second, page reference patterns are rarely sequential within an object, and generally involve random references between many objects.

The LX file format used by OS/2, as well as other formats used by other operating systems, allow a linker to place data, text, and other pages almost anywhere within an application or library executable file image. The present invention detects loading patterns within application and library files, and then reorders the text, data, and other pages within the application and library executable images. The reordering is done such that the pages referenced when an application file or library file is loaded are sequentially placed within the executable file.

A sequential load access pattern is beneficial, as it takes full advantage of read-ahead performed by the file system. When a page is referenced and brought into memory, most file systems automatically bring one or more additional pages (i.e. those stored immediately following the referenced page) into memory. If the additional pages are not needed, they are not used by the loader. However, the present invention allows pages of an executable file to be stored in the order in which they will most likely be loaded. Thus, when the file system performs read-ahead, and brings additional pages into memory, these additional pages are the next pages needed and are loaded. By taking advantage of the file system's read-ahead process, application and library load times can be reduced, because I/O wait time associated with the request of pages is overlapped with the processing (i.e. loading) of previously requested pages.

Further efficiency is gained by sequentially loading DLLs. Not all the pages of a particular DLL are typically used by an application program. By storing the pages of a DLL in the order in which the DLL is loaded, pages that are referenced are stored before those pages which are not referenced. Thus, pages which are not referenced are not likely to ever be brought into memory by the file system's read-ahead process.

The present invention detects the loading pattern of an application file and library files, and then reorders the pages within the executable files so that future loads are sequential. Note that the current embodiment is implemented using a page as the smallest unit used by a loader to perform I/O. However, the method of the present invention may be implemented using a loadable unit of any size. The loading pattern is detected by loading the files and generating a load list, as depicted in FIG. 2.

Figure 2:
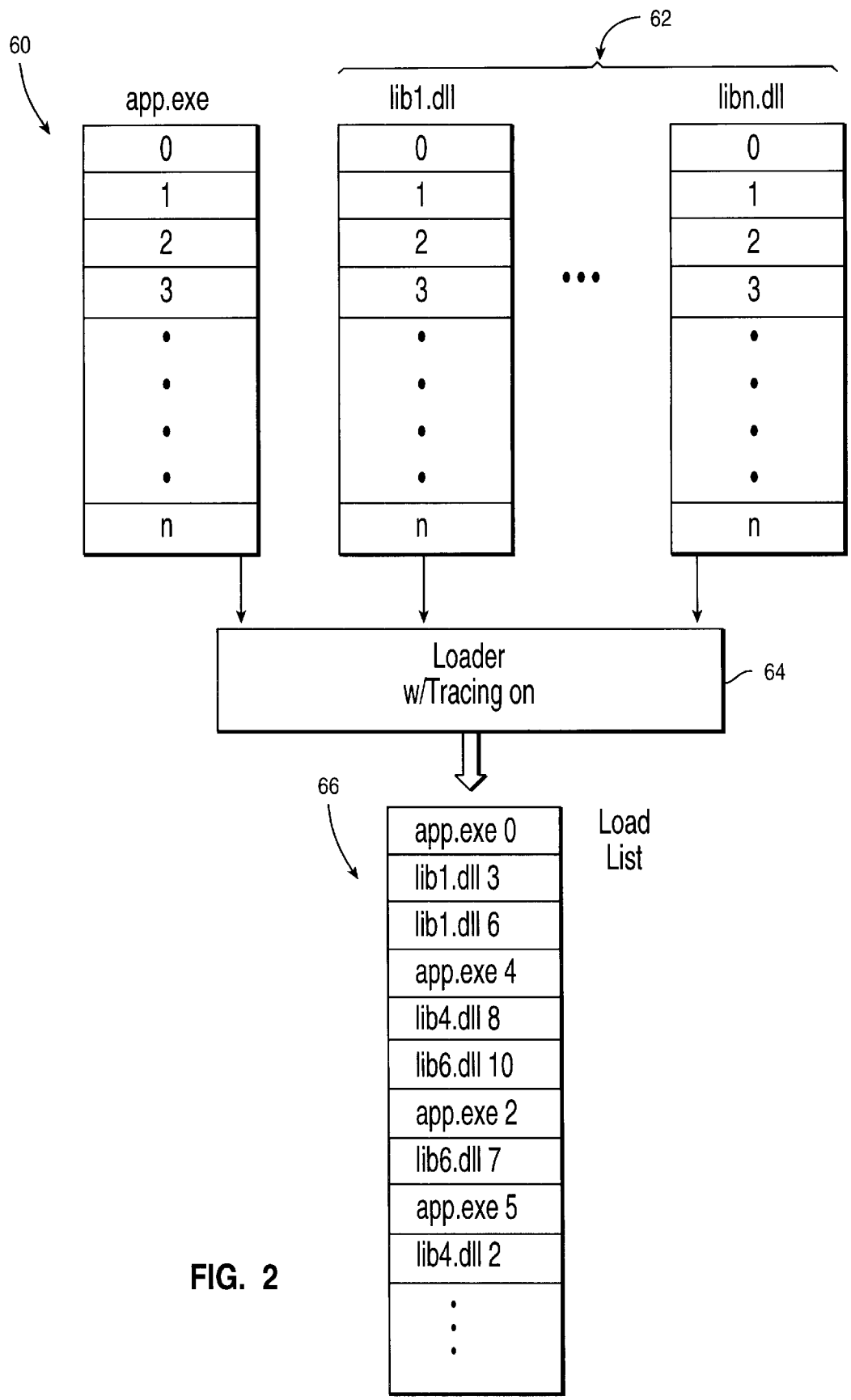
FIG. 2 is a block diagram depicting the creation of a load list according to the teachings of the present invention.

Referring now to FIG. 2, a block diagram depicting components of the present invention will now be described. Application executable file 60, and library executable files 62 are the input files to loader 64. Loader 64 has a tracing feature which tracks the order in which pages are loaded. As each page, whether from application file 60 or one of the library files 62, is loaded, loader 64 stores the file name, page number, and path name (i.e. information regarding the location of the page in storage). After the application program and necessary library files are loaded, the resulting load list 66 may be used to reorder the pages of application program executable file 60 and library files 62.

Load list 66 is a list of pages in the order in which they are loaded. Load list 66 also contains path information (not shown) for each page. As noted above, repeated loads of the same application file or library file will most likely produce consistent page references patterns for each load. Thus, load list 66 may be used to reorder the pages of application files and library files.

Figure 3:
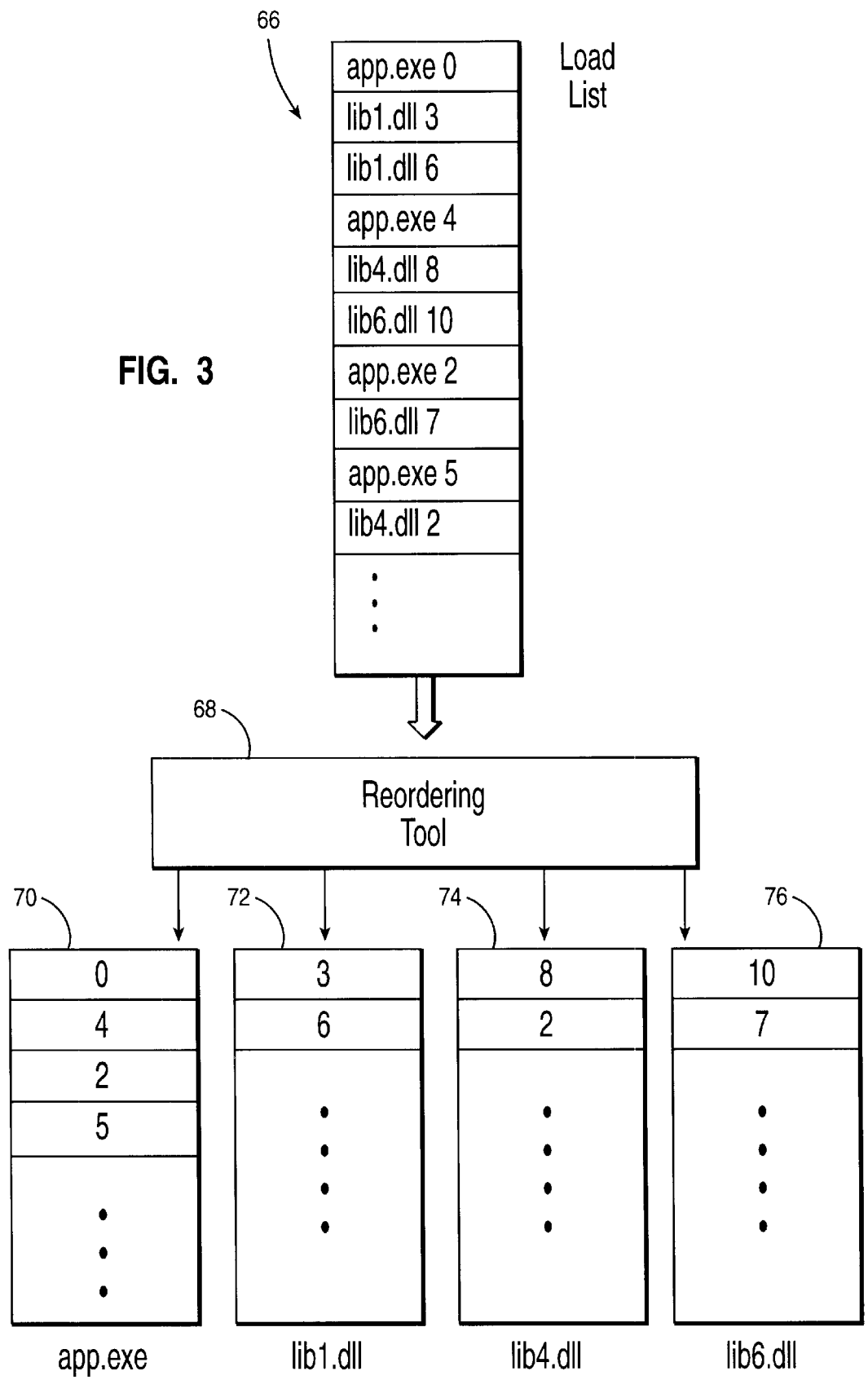
FIG. 3 is a block diagram depicting the creation of reordered application and library files according to the teachings of the present invention.

Referring now to FIG. 3, selected components of the invention used in the reordering process will now be described. Load list 66 is the input to reordering tool 68. Reordering tool 68 creates new executable image files 70, 72, 74, and 76 for application program 60 and library files 62. As shown in FIG. 3, the pages in new executable files 70, 72, 74, and 76 are ordered according to the order in which they are loaded.

Figure 4:
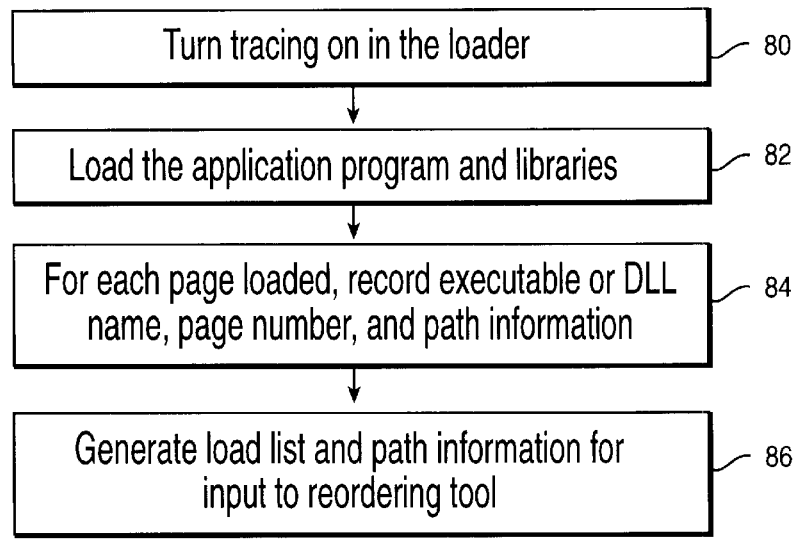
FIG. 4 is a flow chart illustrating the steps of creating a load list.
Figure 5:
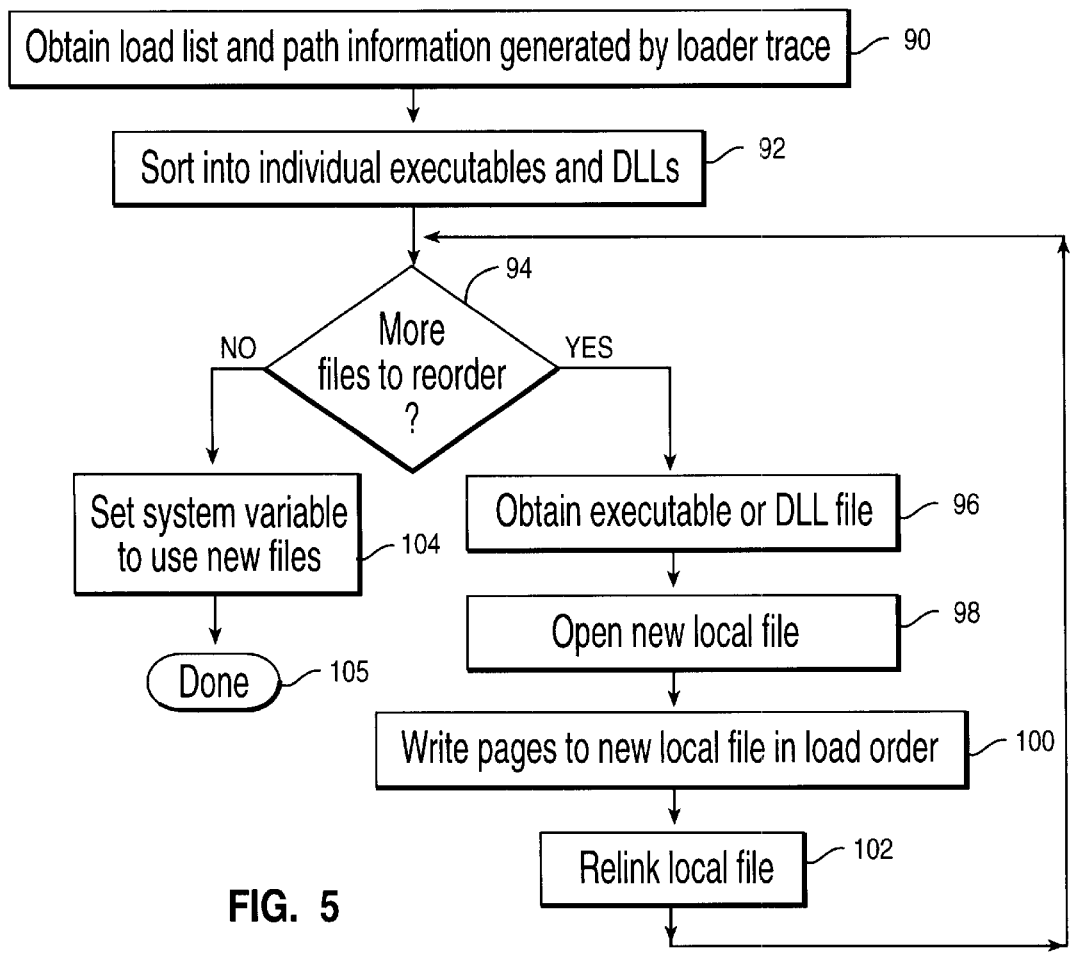
FIG. 5 is a flow chart illustrating the steps of reordering the loading pattern for application and library files.

FIGS. 4 and 5 are flow charts illustrating methods of implementing the present invention. Referring now to FIG. 4, a method for generating a load list will now be described. Tracing is turned on in the loader (step 80), and then the application program and necessary libraries are loaded (step 82). Note that at this point the application program and libraries have not yet been reordered, and so the loading that takes place in step 82 is not a sequential loading. For each page that is loaded, the application or library name, page number, and path information is saved (step 84). A load list is then generated containing the information necessary to reorder the pages of the application file and library files (step 86).

Referring now to FIG. 5, a method for reordering the pages of an application executable file or library file will now be described. The load list and path information generated by the loader are passed as input to a reordering program (step 90). The reordering program sorts the load list into individual application and library files (i.e. a separate load list is generated for each application and library file) (step 92). The reordering program checks to determine if there are more files to reorder (step 94). If so, the original application or library file is obtained, either from local storage or from a network (step 96). A new file is opened (step 98), and pages are copied from the original file into the new file in the desired load order (step 100). Note that the reordered file is stored locally, regardless of the location of the original file. For example, if a library file is obtained from a network, the reordered library file is stored locally and does not interfere with the network copy. The reordered file is used whenever the library file is needed locally. The network copy, which may have been optimized for scenarios other than the local loading scenario, remains unchanged.

After the local file is complete (i.e. all pages have been written in the load order), the local file is relinked (step 102). A linker provides each routine in the application program or library programs with information identifying the locations of other routines, so that the routines can access each other. Because the order of the pages has been changed, routines are located in different locations than before the reordering took place. Thus, the file must be relinked in order to resolve the references between routines and other shared variables, etc. After all application and library files have been reordered and relinked, the proper system variables are set so that subsequent loads use the reordered application and library files (step 104), and the reordering program is complete (step 105).

In all subsequent loading situations, the reordered application and library files are the files which are actually loaded. This results in highly efficient, sequential loading, which takes full advantage of read-ahead. The present invention has been applied to the loading of several application programs, including Netscape Navigator, WordPro, Freelance Graphics, and Lotus Notes. Load times have decreased between 30% and 50% for these programs.

Although the invention has been described with a certain degree of particularity, it should be recognized that elements thereof may be altered by persons skilled in the art without departing from the spirit and scope of the invention. One of the preferred implementations of the invention is as sets of instructions resident in the random access memory 16 of one or more computer systems configured generally as described in FIG. 1. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. A method for loading a computer program, comprising the steps of:

detecting a load order of a plurality of pages of the computer program as it is loaded from a non-volatile storage into a main memory for execution by a processor;

rearranging the pages of the computer program according to the detected load order;

saving the rearranged pages of the computer program in a file, wherein the file contains the pages in the detected load order, and wherein the file is saved in the non-volatile storage; and loading the file containing the rearranged pages of the computer program whenever it is subsequently desired to load the computer program from the non-volatile storage into the main memory for execution.

2. A method according to claim 1, wherein said detecting step comprises the steps of:

loading the computer program from the non-volatile storage into the main memory; and noting the load order in which the pages of the computer program are loaded.

3. A method according to claim 1, further comprising the step of relinking the file containing the rearranged pages of the computer program.

4. A method according to claim 1, further comprising the steps of:

simultaneously obtaining at least two sequential pages of the file containing the rearranged pages of the computer program from a file I/O system; and loading the sequential pages, wherein said loading occurs while one or more additional pages are being obtained by the file I/O system.

5. An information handling system, comprising:

a processor;

main memory means, for holding a computer program being executed by said processor;

non-volatile storage means;

a loader for loading a selected computer program, containing a plurality of pages, from said non-volatile storage means into said main memory means for execution by said processor;

means for detecting a load order of the pages of the selected computer program as it is loaded by said loader;

means for rearranging the pages of the selected computer program according to the detected load order;

means for saving the rearranged pages of the selected computer program in a file in said non-volatile storage means, wherein the file contains the pages in the detected load order; and means for loading the file containing the rearranged pages of the selected computer program from said non-volatile storage means into said main memory means by said loader, whenever it is subsequently desired to load the selected computer program.

6. An information handling system according to claim 5, wherein said means for detecting comprises:

means for loading the selected computer program from said non-volatile storage means into said main memory means; and means for noting the load order in which the pages of the computer program are loaded.

7. An information handling system according to claim 5, further comprising a linker for resolving one or more references within the file containing the rearranged pages of the selected computer program.

8. An information handling system according to claim 5, further comprising:

a file I/O system;

means for simultaneously obtaining at least two sequential pages of the file containing the rearranged pages of the selected computer program from said file I/O system; and means for loading the sequential pages from said non-volatile storage means into said main memory means, wherein said loading occurs while one or more additional pages are being obtained by said file I/O system.

9. A computer readable medium for loading a computer program, comprising:

means for detecting a load order of a plurality of pages of the computer program as it is loaded from a non-volatile storage into a main memory for execution by a processor;

means for rearranging the pages of the computer program according to the detected load order;

means for saving the rearranged pages of the computer program in a file, wherein the file contains the pages in the detected load order, and wherein the file is saved in the non-volatile storage; and means for loading the file containing the rearranged pages of the computer program whenever it is subsequently desired to load the computer program from the non-volatile storage into the main memory for execution.

10. A computer readable medium according to claim 9, wherein said means for detecting comprises:

means for loading the computer program from the non-volatile storage to the main memory for execution; and means for noting the load order in which the pages of the computer program are loaded.

11. A computer readable medium according to claim 9, further comprising means for relinking the file containing the rearranged pages of the computer program.

12. A computer readable medium according to claim 9, further comprising:

means for simultaneously obtaining at least two sequential pages of the file containing the rearranged pages of the computer program from a file I/O system; and means for loading the sequential pages from the non-volatile storage into the main memory, wherein the loading occurs while one or more additional pages are being obtained by the file I/O system.

\* \* \* \* \*